United States Patent [19]

Yoshiura

[11] Patent Number: 5,204,895
[45] Date of Patent: Apr. 20, 1993

[54] DATA COMMUNICATING APPARATUS WHICH SELECTS ANALOG OR DIGITAL COMMUNICATION IN ACCORDANCE WITH THE DESTINATION NUMBER

[75] Inventor: Yoshio Yoshiura, Kanagawa, Japan

[73] Assignee: Canon Kabushiki Kaisha, Tokyo, Japan

[21] Appl. No.: 793,312

[22] Filed: Nov. 14, 1991

Related U.S. Application Data

[63] Continuation of Ser. No. 325,997, Mar. 20, 1989, abandoned.

[30] Foreign Application Priority Data

Mar. 22, 1988 [JP] Japan ................ 63-065844

[51] Int. Cl.⁵ ......................... H04M 11/00
[52] U.S. Cl. .................... 379/100; 358/442
[58] Field of Search ............ 379/100, 93, 96, 97, 379/98, 94; 358/400, 401, 442

[56] References Cited

U.S. PATENT DOCUMENTS

| | | | |
|---|---|---|---|
| 3,917,904 | 11/1975 | Macrander et al. ........ | 379/53 |
| 4,635,275 | 1/1987 | Borg et al. ............... | 379/93 |
| 4,710,951 | 11/1987 | Itezono ................... | 379/100 |
| 4,746,986 | 5/1988 | Tanigawa ................. | 379/93 |
| 4,754,335 | 6/1988 | Izawa et al. ............. | 379/100 |
| 4,785,355 | 11/1988 | Matsumoto ................ | 358/257 |
| 4,825,461 | 4/1989 | Kurita et al. ............ | 379/93 |
| 4,905,273 | 2/1990 | Gordon et al. ............ | 379/100 |
| 4,970,716 | 11/1990 | Goto et al. .............. | 370/58.1 |
| 4,974,097 | 11/1990 | Kaneko et al. ............ | 358/400 |

Primary Examiner—Thomas W. Brown
Assistant Examiner—Stella L. Woo
Attorney, Agent, or Firm—Fitzpatrick, Cella, Harper & Scinto

[57] ABSTRACT

There is provided a data communicating apparatus which can be connected to different communication networks such as a digital network and an analog network, comprising: a digital network communication control unit (digital NCU) to communicate data through a digital communication network; a telephone network communication control unit (TEL NCU) to communicate data through an analog communication network; a selector to select either the digital NCU or the TEL NCU in accordance with the called number of a destination; a circuit to perform an originating call to the communication network selected by the selector; and a switching circuit for discriminating a response signal from the communication network for the originating call by the originating calling circuit and for switching the communication control unit which is selected by the selector when the response signal is a special code. With the apparatus, a line to be used is automatically selected on the basis of the result of the response signal from the network for the originating call.

12 Claims, 6 Drawing Sheets

| FIG. 3A |
|---|
| FIG. 3B |
| FIG. 3C |
| FIG. 3D |

FIG. 3A

PACKET EXCHANGE SERVICE
LIST OF CALL PROGRESS SIG, ETC.

| CALL PROGRESS SIGNAL, ETC. \ TERMINAL EQUIPS | PACKET FORMAT TERMINAL EQUIPMENT (CAUSES FOR CI DISCONNECTION) | SYNCHRONOUS GENERAL TERMINAL EQUIPMENT | SYNCHRONOUS BASIC DATA TRANSMISSION CONTROL PROCEDURE GENERAL TERMINAL EQUIPMENT | START-STOP X SERIES GENERAL TERMINAL EQUIPMENT (CALL PROGRESS SIGNAL) | START-STOP X.28 CONNECTION CONTROL PROCEDURE GENERAL TERMINAL EQUIPMENT (SERVICE SIGNAL) |
|---|---|---|---|---|---|
| DTE DISCONNECT | ○ | — | ○ | — | ○ |
| CALLED TERMINAL BUSY | (NO UNOCCUPIED LCN) ○ RE-CALL | ○ RE-CALL | ○ RE-CALL | ○ RE-CALL | ○ RE-CALL |
| CONNECTION DISENABLE | STOP RE-CALL ○ | STOP RE-CALL ○ | ○ | STOP RE-CALL ○ | ○ |

FROM FIG. 3A

| | | | | | | | |
|---|---|---|---|---|---|---|---|
| REMOTE PROCEDURE ERROR | STOP RE-CALL | O | STOP RE-CALL | O | STOP RE-CALL | O | O |
| INVALID CALL | STOP RE-CALL | O | STOP RE-CALL | O | STOP RE-CALL | O | O |
| CONNECTION RESTRICTION | STOP RE-CALL | O | STOP RE-CALL | O | STOP RE-CALL | O | O |
| LOCAL PROCEDURE ERROR | STOP RE-CALL | O | STOP RE-CALL | O | STOP RE-CALL | O | O |
| MISSING NUMBER | STOP RE-CALL | O | STOP RE-CALL | O | STOP RE-CALL | O | O |
| NETWORK BLOCKING (LONG TERM) | STOP RE-CALL | O | STOP RE-CALL | O | STOP RE-CALL | O | O |
| NETWORK BLOCKING (SHORT TERM) | — | O RE-CALL | | O RE-CALL | | O RE-CALL | O RE-CALL |
| SEL SIG PROCEDURE ERROR | — | O RE-CALL | | O RE-CALL | | O RE-CALL | O RE-CALL |

FROM FIG. 3B / TO FIG. 3D

| | | | | | (INTERNATIONAL CONNECTION ONLY) |
|---|---|---|---|---|---|
| SEL SIG TRANSMISSION ERROR | — | O RE-CALL | O RE-CALL | O RE-CALL | O RE-CALL |
| NUMBER CHANGE | — | STOP RE-CALL | O | O | — |
| INCOMING REJECT | — | STOP RE-CALL O | O | O | O |
| REGISTER RELEASE END | — | O | O | O | O |
| INCOME CHARGE UNREGISTERED | STOP RE-CALL O | — | — | — | — |
| MISMATCH CALL | STOP RE-CALL O | — | — | — | — |
| PAD DISCONNECT | — | — | — | — | O |
| RELEASE CONFIRM | — | — | O | — | O |

FIG. 3D

FROM FIG. 3C

| | | | | | (END SIG NOT RECEIVED) | (RI PACKET IN COMMUNICATION) |
|---|---|---|---|---|---|---|
| NON-RESPONSE | ○ RE-CALL | ○ | — | — | — | — |
| COMM DISENABLE | STOP RE-CALL | ○ | — | — | — | — |

RE-CALL : IT IS ALLOWABLE TO CALL AGAIN THE SAME DESTINATION WITHIN 3 MINUTES AFTER RECEPTION OF EACH PROGRESS SIGNAL

STOP RE-CALL : THE RE-CALL IS INHIBITED

DATA COMMUNICATING APPARATUS WHICH SELECTS ANALOG OR DIGITAL COMMUNICATION IN ACCORDANCE WITH THE DESTINATION NUMBER

This application is a continuation of application Ser. No. 07/325,997 filed Mar. 20, 1989, now abandoned.

BACKGROUND OF THE INVENTION

1. Field of the Invention

The present invention relates to a data communicating apparatus which can be connected to, for instance, different types of communication networks such as a digital network and an analog network.

2. Related Background Art

Hitherto, as such a kind of apparatus, there has been known a facsimile apparatus which can be connected to, for instance, a digital network and an analog network (telephone network).

A facsimile apparatus, connected to a digital network and a telephone network which can perform the facsimile communication in G3/G4 modes between the two networks, is arranged in such a manner that a caller previously confirms a type of a line available for a destination and manually designates a line type to send data.

However, in the conventional apparatus, since the caller must confirm a type of the destination in advance and then operate the apparatus, the apparatus is complicated to operate and an operator frequently sets the line type erroneously. If the line type of the destination is erroneously set, there is no means for changing the designation of a line type. In this case, a correct line type must be again designated after the communication is disenabled and the line type setting operation as before-mentioned must be executed again.

Examples of the G3/G4 facsimile apparatus have been applied in U.S. patent application Ser. Nos. 120,104 (filed on Nov. 13, 1987), now U.S. Pat. No. 4,974,097, and 276,931 (filed on Nov. 28, 1988), now Ser. No. 604,991 (filed on Oct. 29, 1990). Examples with respect to the facsimile apparatus which can be connected to multilines have been applied in U.S. patent applications Ser. Nos. 813,514 (filed on Dec. 26, 1985) and now U.S. Pat. No. 4,785,355, and 823,286 (filed on Jan. 28, 1986), now U.S. Pat. No. 4,825,461.

SUMMARY OF THE INVENTION

It is an object of the present invention to solve the above-mentioned problems and to improve a data communicating apparatus.

Another object of the invention is that in a data communicating apparatus which can be connected to, for instance, different communication networks such as a digital network and an analog network, a line to be used is automatically selected.

Still another object of the invention is that a response signal from the network for an originating call is discriminated and a line to be used is automatically selected on the basis of the result of the discrimination.

The above and other objects and features of the present invention will become apparent from the following detailed description and the appended claims with reference to the accompanying drawings.

DETAILED DESCRIPTION OF THE PREFERRED EMBODIMENTS

An embodiment according to the present invention will be described in detail hereinbelow with reference to the drawings.

Figure 1:
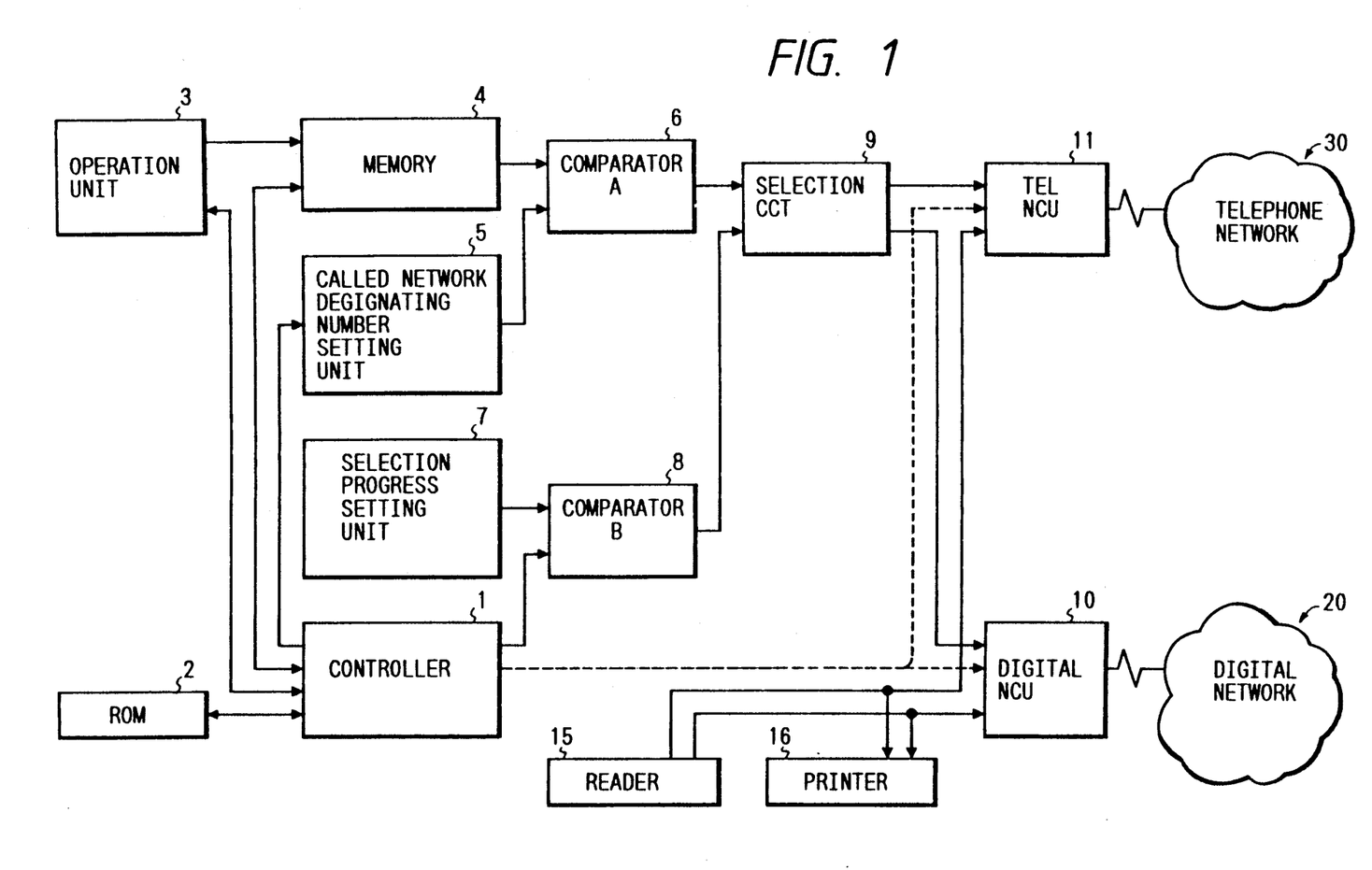
FIG. 1 is a block diagram showing an arrangement of an embodiment.

FIG. 1 is a block diagram of an embodiment according to the invention. In the diagram, reference numeral 1 denotes a controller to control the whole operation in the embodiment in accordance with a program stored in an ROM 2 and shown in FIG. 2, which will be explained hereinlater. The controller 1 comprises a microcomputer or the like. Reference numeral 2 denotes the ROM to store not only the foregoing program but also parameters or the like which are used in the embodiment; 3 indicates an operation unit comprising a plurality of keys such as a telephone number key to input the number of the destination or the like, a start key to start the facsimile communication, and the like, a key input scanning circuit, etc.; 4 a memory to temporarily store the input telephone number or the like from the operation unit 3; and 5 a called network designating number setting unit which is used to discriminate the type of originating call destination network. The designating number is set by the controller 1. However, the called network designating number setting unit 5 may be also constructed by switches and the like so as to register the designating number in accordance with the setting states of the switches. Reference numeral 6 denotes a comparator A for comparing the originating call destination telephone numbers which are sent from the called network designating number setting unit 5 and memory 4 and for outputting a coincidence signal when they coincide. Reference numeral 7 denotes a selection progress setting unit to designate a "missing number" code (selection progress) of a call progress; 8 indicates a comparator B for comparing the "missing number" code from the selection progress setting unit 7 with the call progress which is returned from a digital network 20 and indicates a connecting situation of a terminal on the transmission side and for outputting a coincidence code when the coincidence with the "missing number" code in the call progress from the digital network 20 is detected; 9 a selection circuit (of switching circuit) for selecting and activating either one of a digital network communication control unit (hereinafter, referred to as a digital NCU) 10 and a telephone network (analog network) communication control unit (hereinafter, simply referred to as a TEL NCU) 11 on the basis of the coincidence signals from the comparators A 6 and B 8; and 10 the digital NCU serving as a communication interface with the digital network 20. In the embodiment, the digital NCU 10 executes the communication control in the G4 mode of the well-known facsimile apparatus. Reference numeral 11 denotes the TEL NCU serving as a communication interface with a telephone network (analog network) 30. In the embodiment, the TEL NCU 11 executes the communication control in the G3 mode of the well-known facsimile apparatus.

On the other hand, reference numeral 15 denotes a reader for reading a set original and transmitting the read image information to the digital NCU 10 and TEL NCU 11 under the control of the controller 1; and 16 indicates a printer for printing out the received information from the digital NCU 10 and TEL NCU 11 under the control of the controller 1. Reference numeral 20 denotes the digital network and 30 represents the telephone network.

In the foregoing arrangement, in the case of performing an originating call to a desired destination are transmitting the read information from the reader 15, the operator inputs the telephone number of the originating call destination by the telephone number key in the operation unit 3. The input telephone number is once stored into the memory 4. On the other hand, the controller 1 presets the number "4401" of the first four digits indicative of the service user's number of, for instance, VENUS-P (packet exchange service of the digital network) of the international data line into the called network designating number setting unit 5. Therefore, the comparator A 6 compares the set number of the setting unit 5 with the input telephone number from the memory 4 and outputs a coincidence/dissidence signal to the selection circuit 9.

The selection circuit 9 receives the coincidence/dissidence signal from the comparator A 6 and selects and activates either the digital NCU 10 or TEL NCU 11. The original information input from the reader 15 is transmitted to either the digital network 20 or telephone network 30 selected.

When an originating call is input from a network connected, the communication control unit connected to the network is activated. Therefore, the activated communication control unit executes the ordinary receiving process and outputs the received image to the printer 16.

A detailed algorithm will now be described hereinbelow with reference to a flowchart of FIG. 2.

First, the controller 1 checks to see if an originating call such as an input of the telephone number from the operation unit 3 or the like has been requested or not in step S1. If NO, step S2 follows and the process requested is executed. For instance, if a call from the network had been input to either the digital NCU 10 or TEL NCU 11 and the called NCU has been activated, the processes to receive the transmitted data and print out by the printer 16 and the like are executed.

On the other hand, if an originating call has been requested in step S1, step S3 follows and the telephone number input from the operation unit 3 is stored into the memory 4. Such a process is continued until the start key is depressed. When the start key is depressed, the processing routine advances from step S4 to step S5. The controller 1 checks the number which has been preset in the ROM 2 (or the number which has been preset by a switching circuit (not shown)), thereby discriminating whether the terminal relates to the VENUS P subscriber or not.

As the result of the discrimination, if the terminal relates to the VENUS-P subscriber, step S6 follows and a check is made to see if the input telephone number to the memory 4 is constructed by nine digits in accordance with the number schedule and the first four digits are "4408" or not. If YES, step S10 follows and the digital NCU 10 is activated to access the international line. If it is determined that no destination subscriber exists as the result of the access, a call progress code indicative of the "missing number" is returned from the network. Therefore, in the next step S11, the comparator B 8 compares the call progress code which is returned from the digital NCU with the set value of the selection progress setting unit 7. If they are equal (that is, when the "missing number" code has been sent), it is determined to execute the communication in the G3 mode and step S12 follows. In step S12, the TEL NCU 11 is activated. In step S13, the originating calling process is executed to the telephone network 30 and the facsimile communication is performed in the G3 mode.

If a code other than the "missing number" code has been returned in step S11, step S15 follows and the facsimile communication control in the G4 mode is executed. If the other call progress code has been sent, this means that although the destination is the G4 mode communication terminal, another network obstacle occurs or the like, so that the requested process is executed.

On the other hand, if the terminal does not relate to the VENUS-P subscriber in step S5 and if the first four digits are not "4408" in step S6, step S20 follows and a check is made to see if the user is the VENUS-P service user via the first digital line (for instance, the NTT line in Japan) or not. If YES in step S20, step S21 follows and a check is made to see if the input telephone number is constructed by eleven digits according to the number schedule and at the same time the first four digits are "4401" or not. If YES in step S21, the processes in step S10 and subsequent steps are executed. The digital NCU 10 is activated and the international line is similarly accessed.

If it is determined in step S20 that the user is not the VENUS-P service user via the first digital line, step S22 follows.

If NO in steps S20 and S21, step S22 follows and check is made to see if the first digit is "0" or not. If the first digit is "0", this means that the originating call destination telephone number is a trunk prefix number to the telephone network 30. Therefore, the processing routine advances to step S12 and subsequent steps and the TEL NCU 11 is activated, thereby executing the facsimile communication in the G3 mode with the telephone network 30.

If the first digit is not "0" in step S22, step S25 follows and a check is made to see if the input telephone number is constructed by seven digits according to the number schedule of the domestic line of the digital network 20 and at the same time the first two digits are the numbers specified by a district or not. If they are the numbers specified by a district, the processing routine similarly advances to step S10 and the facsimile communication is executed through the digital network 20.

Figures 3, 3A:
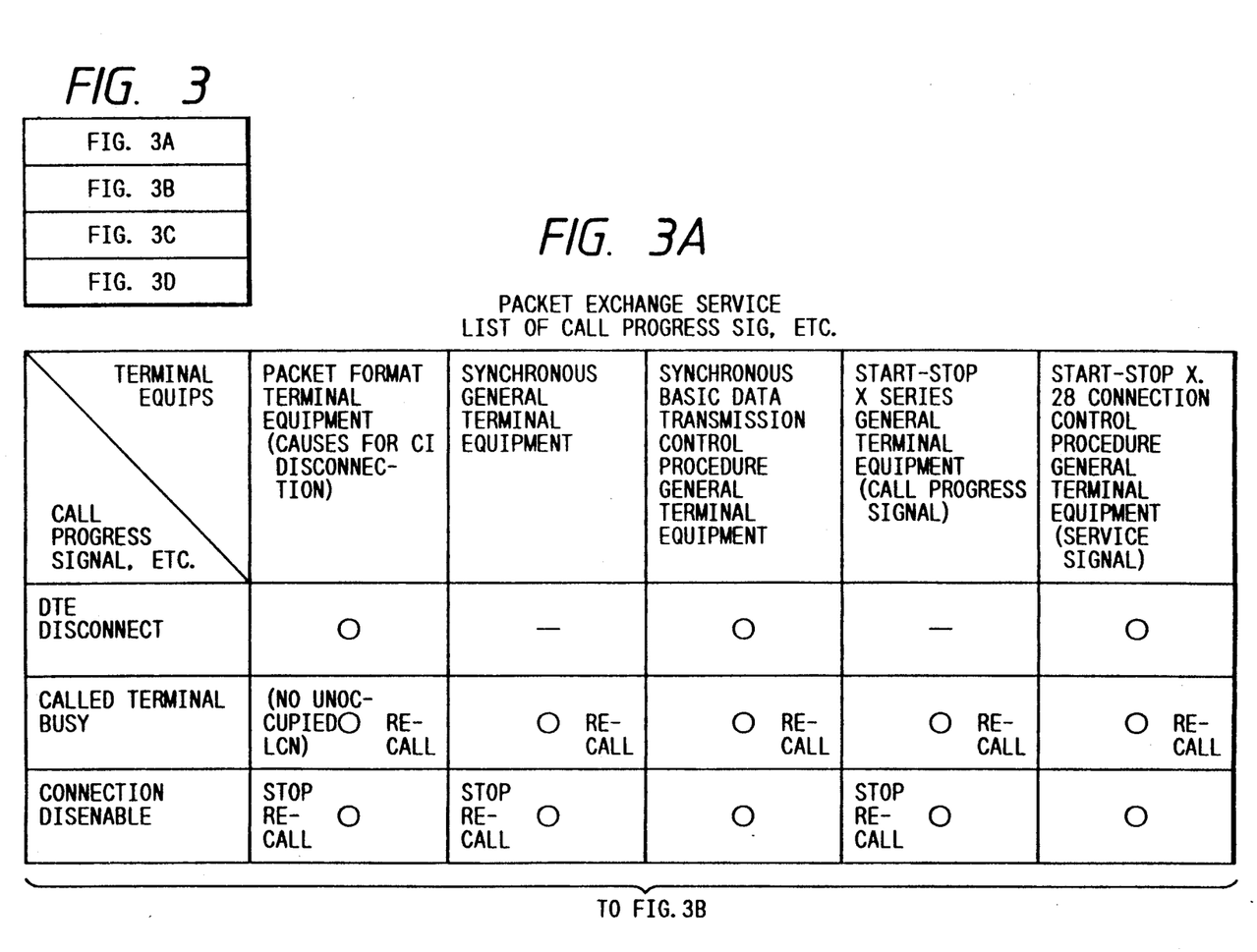
FIG. 3 is a diagram showing the layout of FIGS. 3A to 3D.
FIGS. 3A to 3D show the types of call progress signals.
Figure 3B:
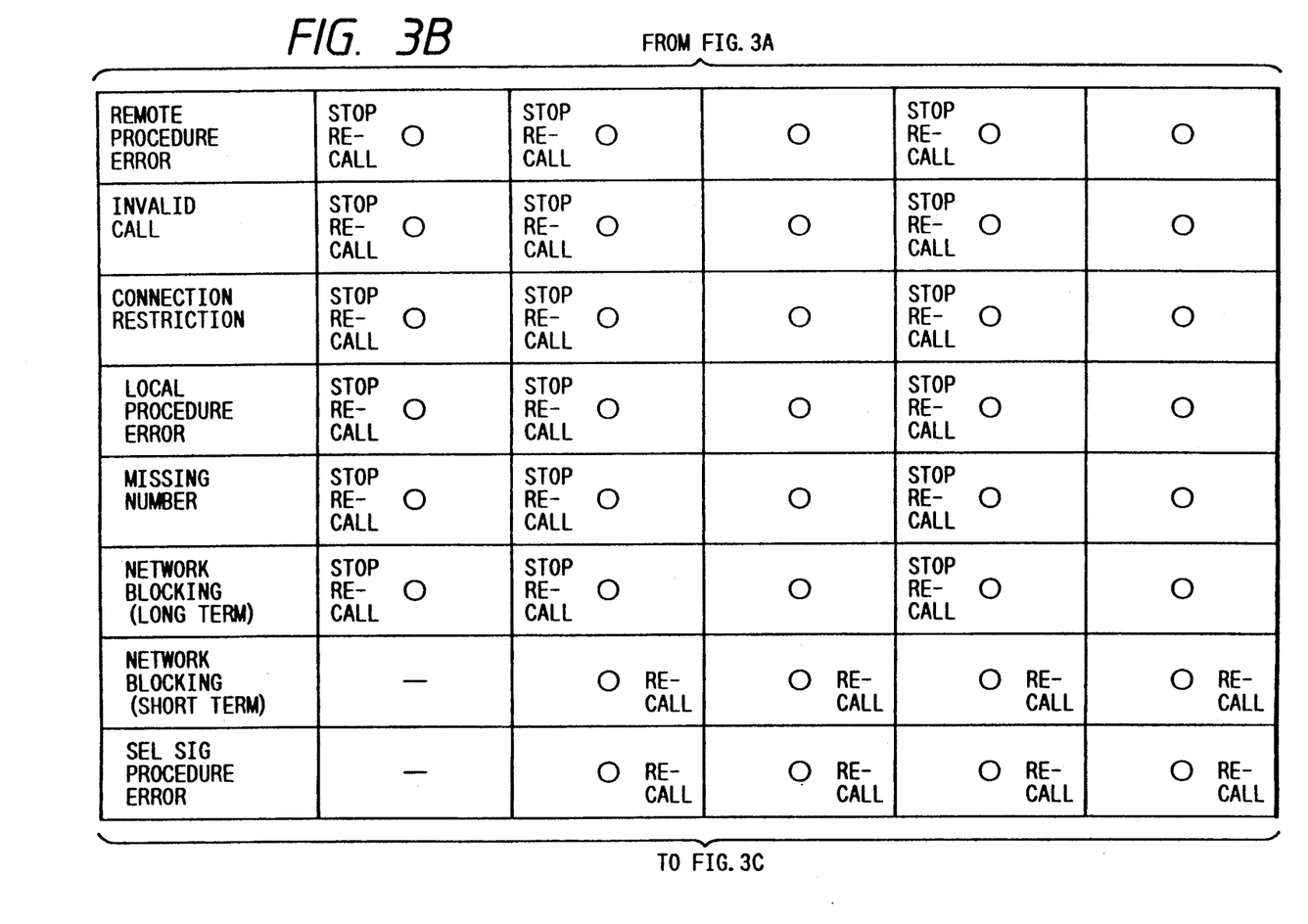
Figure 3C:
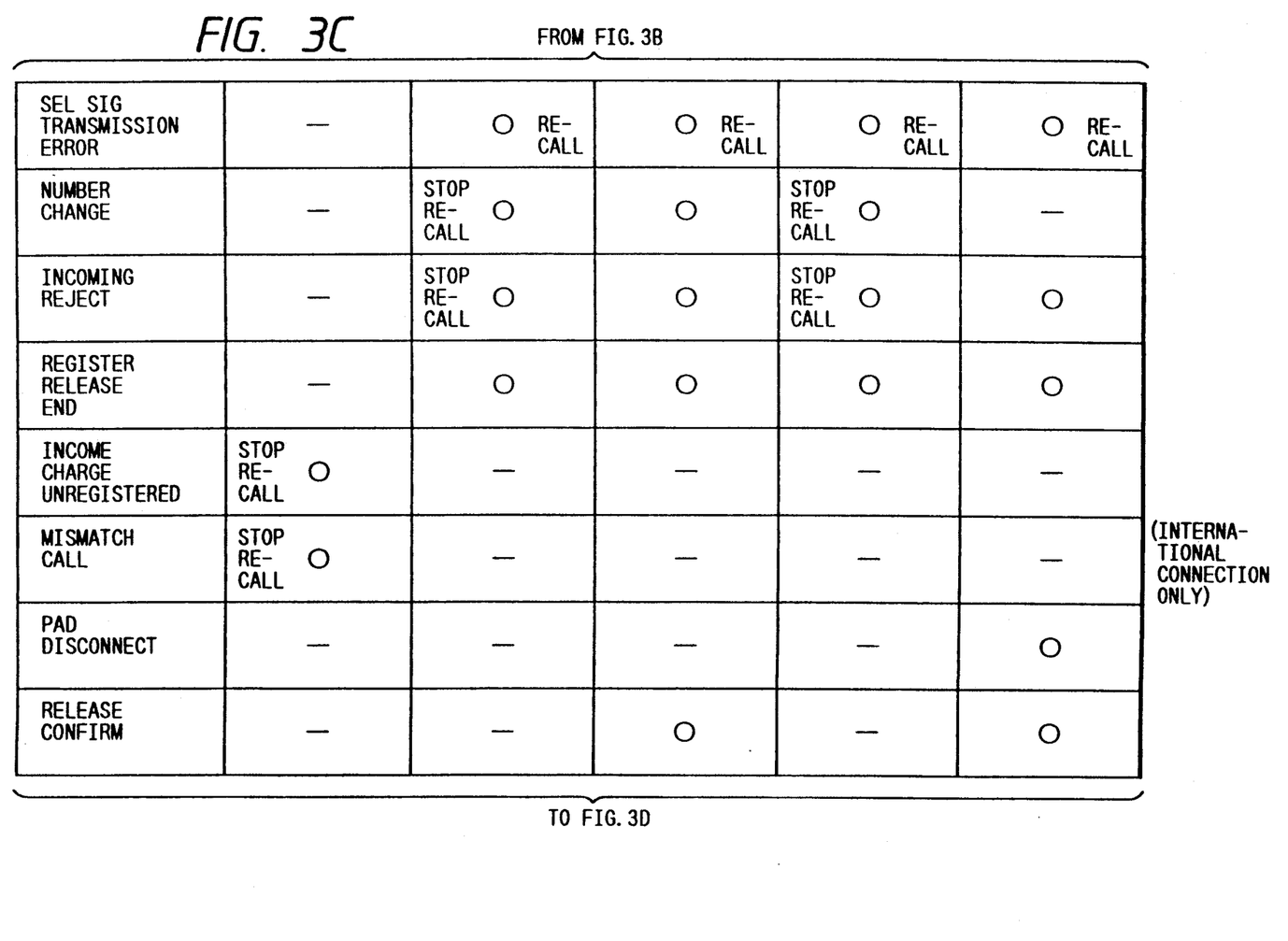
Figure 3D:
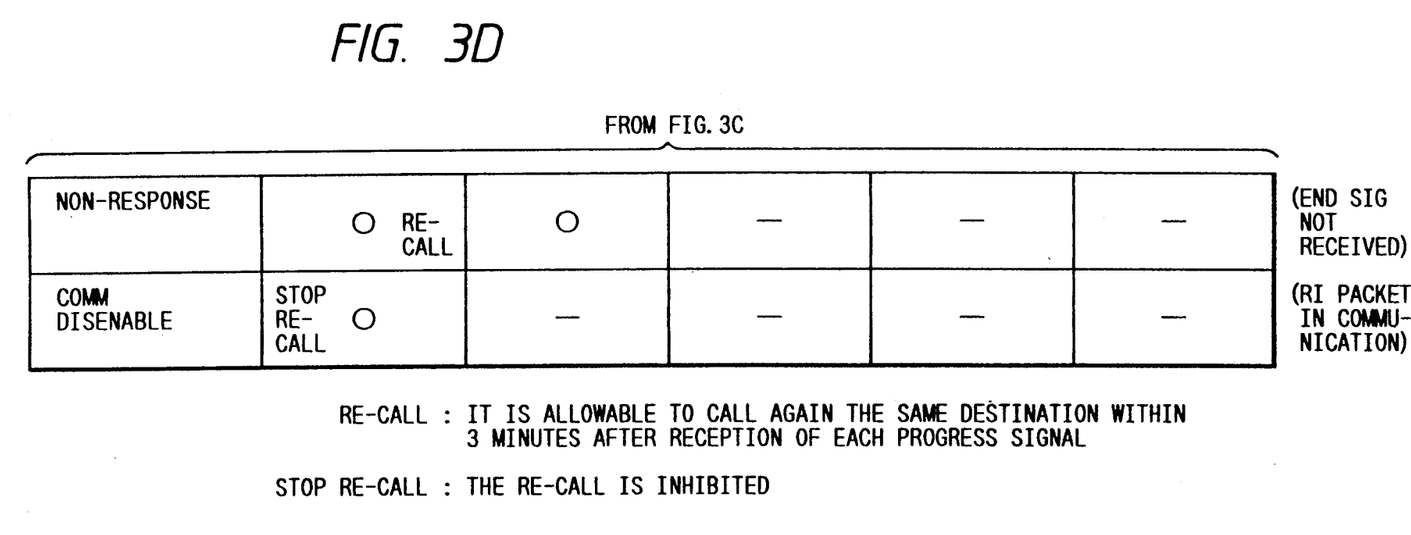

As described above, according to the embodiment, by using the number schedule and the "missing number" code of the call progress code, a desired line can be automatically selected without performing the manual operation of the user. Examples of the call progress codes from the digital network are shown in FIG. 3. In the embodiment, the "missing number" codes shown in FIG. 3 are used.

In the case of transmitting the same numbers at the second and subsequent times, if the processing transmitting mode is stored, no discriminating routine is necessary and the type of line can be automatically accurately determined.

Even in the case of the same digital line, since there are a packet exchange network and a line exchange network, on the transmission side, it is necessary to previously check to which network the digital line corresponds and to check whether the communication can be executed or not. However, in general, in the case of the facsimile apparatus, since the G4 mode apparatus corresponds to the line exchange network due to its nature, if the facsimile apparatus on the transmission side corresponds to the line exchange network, there is no need to make any special consideration.

Figure 2:
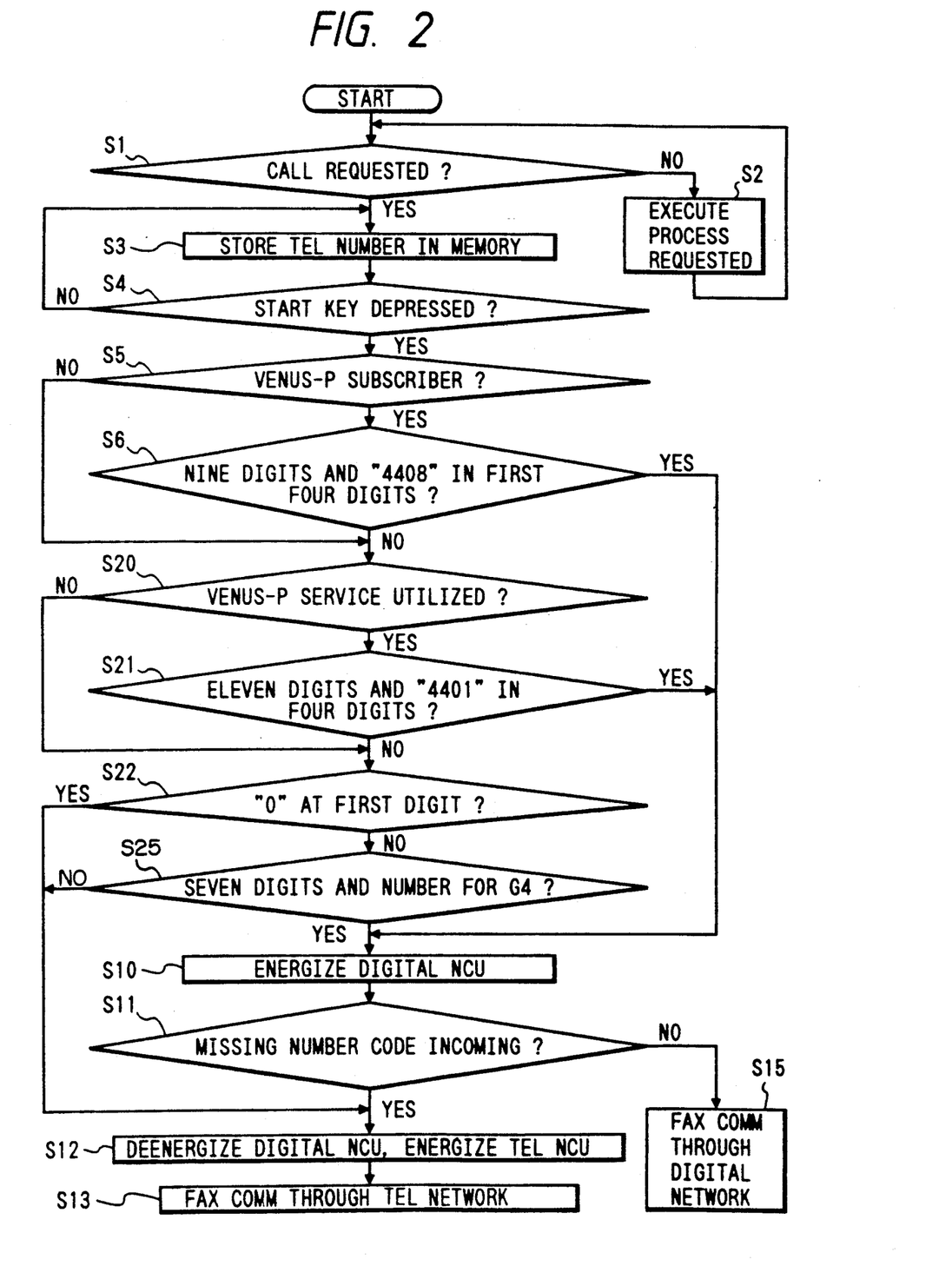
FIG. 2 is a flowchart showing the control operation of a controller 1.

Since the flowchart shown in FIG. 2 shows the case of the packet exchange network, the discriminating routine of the VENUS-P exists. However, in the case of the line exchange network, steps S5, S6, S20, and S21 are unnecessary.

OTHER EMBODIMENTS

The present invention is not limited to the foregoing embodiments but various modifications are possible. For instance, as another embodiment, it is also possible to construct in a manner such that the special hardware circuits such as comparators A 6 and B 8 and the like are not used but their comparing processes are realized by the program control (software) of the controller 1 and the network to be connected is selected on the basis of the results of the discrimination.

On the other hand, if a function to check the ID (abbreviation) of the reception side on the transmission side is added to the G4 function, it is also possible to check to see if the transmission side has been correctly selected or not. Therefore, no problem occurs in terms of the security.

As mentioned above, according to the embodiment, there is provided means for detecting the coincidence with the "missing number" code in the call progress which is return from the digital network and indicates the connecting state of the terminal on the transmission side and for switching to the G3 mode. Or, there is provided means for comparing the dial numbers which are input by the user with the numbers according to the number schedule specified on the basis of the CCITT recommendation, X.121 and the domestic regulation and for selecting the G3/G4 mode. Due to this, the operation by the user becomes unnecessary and the relevant line can be automatically selected.

Although the embodiments have been described above with respect to the facsimile apparatus as an example, the invention is not limited to the facsimile apparatus but can be also applied to all of the data communicating apparatuses (teletex, personal computer communication, telex, and the like) which can be connected to both of the digital network and analog network.

The present invention is not limited to the foregoing embodiments but many modifications and variations are possible within the spirit and scope of the appended claims of the invention.

I claim:

1. A data communicating apparatus connected to a first communication line of a first communication network and a second communication line of a second communication network, said apparatus comprising:
   first communicating means for performing a calling access to the first communication line and performing a data communication through the first communication network;
   second communicating means for performing a calling access to the second communication line and performing a data communication through the second communication network, wherein said second communicating means performs the data communication in a communication mode different from that of said first communicating means;
   input means for inputting a destination number; and
   control means for discriminating whether the destination number is a subscriber number of the first communication network or a subscriber number of the second communication network, and selecting either said first communicating means or said second communicating means in accordance with the discrimination result, wherein said first communication network comprises a digital communication network and said second communication network comprises an analog communication network.

2. An apparatus according to claim 1, wherein said control means selects said second communication means when at least a first digit of the destination number is discriminated to be equivalent to a predetermined number.

3. An apparatus according to claim 1, wherein said control means selects said first communication means when the destination number is discriminated to be equivalent to a subscriber number in said digital network.

4. An apparatus according to claim 1, further comprising memory means for storing information of the communication network to which an apparatus of a destination to be communicated is connected, and wherein said control means selects in accordance with the information stored in said memory means.

5. A data communicating apparatus comprising:
   first communicating means for performing a communication of data through a first communication network that is a digital communication network;
   second communicating means for performing a communication of data through a second communication network that is an analog communication network;
   input means for inputting a destination number; and
   control means for discriminating the destination number,
   wherein at least one first network number is associated with the first communication network and at least one second network number is associated with the second communication network,
   wherein said control means selects said first communicating means when the destination number corresponds to the first network number,
   wherein said control means selects said second communicating means when the destination number corresponds to the second network number,
   wherein said control means, when calling a destination identified by the destination number through said first communicating means, discriminates a response signal from the first communication network, and
   wherein said control means switches said first communicating means to said second communicating means to call the destination when the response signal is discriminated to indicate that there is no subscriber corresponding to the destination number in the first communication network.

6. A facsimile apparatus comprising:
   telephone network communicating means for performing a facsimile communication with a telephone network;
   digital network communicating means for performing a facsimile communication through a digital network;

input means for inputting a destination number; and control means adapted to, when calling the destination number through said digital network, discriminate a response signal from said digital network and adapted to switch said digital network communication means to said telephone network communication means in accordance with the discrimination result, wherein said control means switches to said telephone network communication means when the response signal indicates that the destination number is not equivalent to any subscriber in the digital network; and selecting means for selecting either said digital network communicating means or said telephone network communicating means in response to said control means.

7. An apparatus according to claim 6, wherein said control means discriminates the destination number input by said input means, wherein at least one first network number is associated with said digital network and at least one second network number is associated with said telephone network, wherein said control means selects said digital communication means when the destination number corresponds to the first network number, and wherein said control means selects said telephone network communicating means when the destination number corresponds to the second network number.

8. An apparatus according to claim 7, wherein said control means selects said second communication means when at least a first digit of the destination number is discriminated to be equivalent to a predetermined number.

9. A data communicating apparatus connectable to a digital communication line of a digital network and an analog communication line of an analog network, said apparatus comprising:

a digital communication unit adapted for performing a calling access to the digital communication line and for performing a data communication through the digital network;

an analog communication unit adapted for performing a calling access to the analog communication line and for performing a data communication through the analog network;

a console unit including a key for inputting a destination number;

a control circuit for discriminating whether the destination number input by said console unit comprises a predetermined number; and a selecting circuit for selecting either said digital communication unit or said analog communication unit in response to an output from said control circuit, wherein said digital communication unit and said analog communication unit perform the data communication in different communication modes, respectively.

10. A data communication apparatus connectable to a digital communication line of a digital network and an analog communication line of an analog network, comprising:

a digital communication unit adapted for performing a calling access to a digital communication line and for performing a data communication through the digital network;

an analog communication unit adapted for performing a calling access to the analog communication line and for performing a data communication through the analog network;

a console unit including a key for inputting a destination number;

a control circuit for discriminating whether the destination number input by said console unit comprises a predetermined number; and a selecting circuit for selecting either said digital communication unit or said analog communication unit in response to said control circuit, wherein said control circuit selects said analog communication unit when a first digital of the destination number is discriminated as zero.

11. An apparatus according to claim 9, wherein said control circuit selects said digital communication unit when the destination number is discriminated to compute a number indicating the digital network.

12. A data communication apparatus connectable to a digital network and an analog network, comprising:

a digital communication unit adapted for performing a calling access to the digital network and for performing a data communication through the digital network;

an analog communication unit adapted for performing a calling access to the analog network and for performing a data communication through the analog network;

a console unit including a key for inputting a destination number;

a control circuit adapted to when calling the destination number by said digital communication unit, switch said digital communication unit to said analog communication unit in response to a signal indicating that the destination number is not equivalent to any subscriber on the digital network; and a selecting circuit for selecting either said digital communication unit or said analog communication unit in response to said control circuit.

* * * * *

UNITED STATES PATENT AND TRADEMARK OFFICE
CERTIFICATE OF CORRECTION

PATENT NO. : 5,204,895
DATED : April 20, 1993
INVENTOR(S) : Yoshio Yoshiura

It is certified that error appears in the above-indentified patent and that said Letters Patent is hereby corrected as shown below:

The title page, showing an illustrative figure, should be deleted and substitute therefor the attached title page.

Delete drawing sheet 1 and substitute therefor the drawing sheet, consisting of fig.1, as shown on the attached pages.

Fig. 1, "Degignating" should read --Designating--.

Column 2 line 67, "hand-" should read --hand,--.

Column 3 line 9, "are" should read --and--.
line 57, "venue P" should read --Venus-P Column 8 line 5, "communication" should read --communication--.

Signed and Sealed this

Twenty-seventh Day of September, 1994

Attest:

BRUCE LEHMAN

Attesting Officer  Commissioner of Patents and Trademarks

United States Patent [19]

Yoshiura

[11] Patent Number: 5,204,895

[45] Date of Patent: Apr. 20, 1993

[54] DATA COMMUNICATING APPARATUS WHICH SELECTS ANALOG OR DIGITAL COMMUNICATION IN ACCORDANCE WITH THE DESTINATION NUMBER

[75] Inventor: Yoshio Yoshiura, Kanagawa, Japan

[73] Assignee: Canon Kabushiki Kaisha, Tokyo, Japan

[21] Appl. No.: 793,312

[22] Filed: Nov. 14, 1991

Related U.S. Application Data

[63] Continuation of Ser. No. 325,997, Mar. 20, 1989, abandoned.

[30] Foreign Application Priority Data

Mar. 22, 1988 [JP] Japan .................. 63-065844

[51] Int. Cl.⁵ .......................... H04M 11/00
[52] U.S. Cl. ......................... 379/100; 358/442
[58] Field of Search ............ 379/100, 93, 96, 97, 379/98, 94; 358/400, 401, 442

[56] References Cited

U.S. PATENT DOCUMENTS

| | | | |
|---|---|---|---|
| 3,917,904 | 11/1975 | Macrander et al. | 379/53 |
| 4,635,275 | 1/1987 | Borg et al. | 379/93 |
| 4,710,951 | 11/1987 | Itezono | 379/100 |
| 4,746,986 | 5/1988 | Tanigawa | 379/93 |
| 4,754,335 | 6/1988 | Izawa et al. | 379/100 |
| 4,785,355 | 11/1988 | Matsumoto | 358/257 |
| 4,825,461 | 4/1989 | Kurita et al. | 379/93 |
| 4,905,273 | 2/1990 | Gordon et al. | 379/100 |
| 4,970,716 | 11/1990 | Goto et al. | 370/58.1 |
| 4,974,097 | 11/1990 | Kaneko et al. | 358/400 |

Primary Examiner—Thomas W. Brown
Assistant Examiner—Stella L. Woo
Attorney, Agent, or Firm—Fitzpatrick, Cella, Harper & Scinto

[57] ABSTRACT

There is provided a data communicating apparatus which can be connected to different communication networks such as a digital network and an analog network, comprising: a digital network communication control unit (digital NCU) to communicate data through a digital communication network; a telephone network communication control unit (TEL NCU) to communicate data through an analog communication network; a selector to select either the digital NCU or the TEL NCU in accordance with the called number of a destination; a circuit to perform an originating call to the communication network selected by the selector; and a switching circuit for discriminating a response signal from the communication network for the originating call by the originating calling circuit and for switching the communication control unit which is selected by the selector when the response signal is a special code. With the apparatus, a line to be used is automatically selected on the basis of the result of the response signal from the network for the originating call.

12 Claims, 6 Drawing Sheets

FIG. 1